Oct. 30, 1956
A. M. CLOGSTON
2,769,148
ELECTRICAL CONDUCTORS
Filed March 7, 1951
7 Sheets-Sheet 1
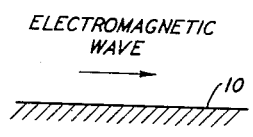
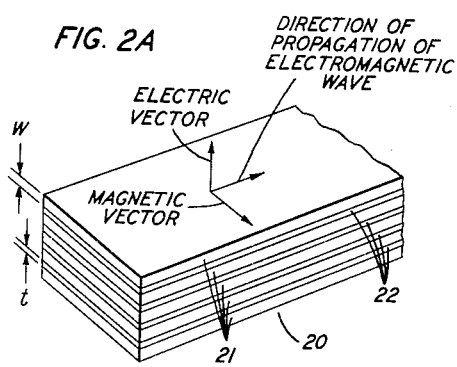
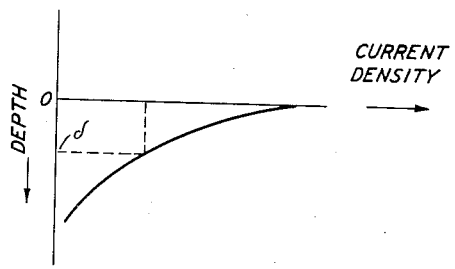
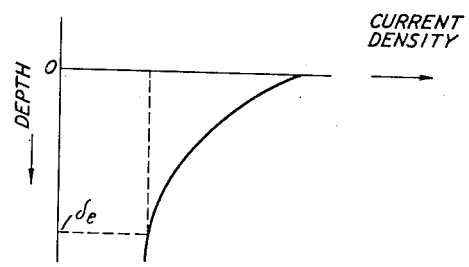
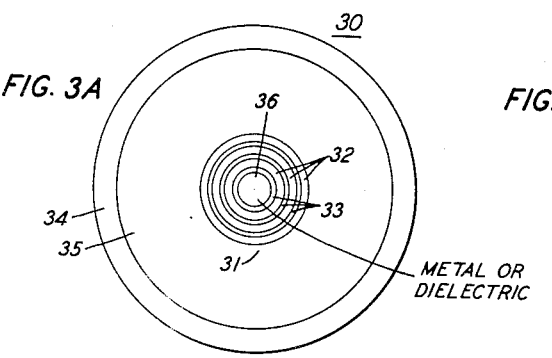
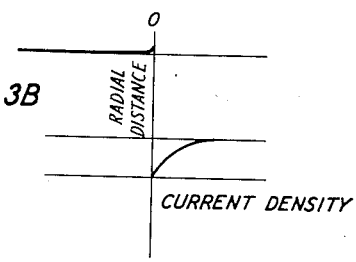
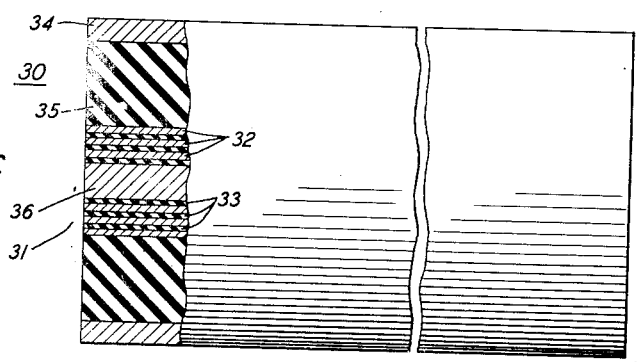
INVENTOR
A. M. CLOGSTON
BY
Hugh S. Wertz
ATTORNEY Oct. 30, 1956    A. M. CLOGSTON    2,769,148
ELECTRICAL CONDUCTORS
Filed March 7, 1951    7 Sheets-Sheet 2

ATTENUATION IN NEPERS FOR SELECTED LENGTH OF CABLE

DIELECTRIC CONSTANT ($\varepsilon$) OF INSULATING MEDIUM BETWEEN INNER AND OUTER CONDUCTORS INVENTOR
A. M. CLOGSTON
BY
Hugh S. Wertz
ATTORNEY Oct. 30, 1956    A. M. CLOGSTON    2,769,148
ELECTRICAL CONDUCTORS
Filed March 7, 1951    7 Sheets-Sheet 3

INVENTOR
A. M. CLOGSTON
BY
Hugh S. Wertz
ATTORNEY

Oct. 30, 1956     A. M. CLOGSTON     2,769,148
ELECTRICAL CONDUCTORS

Filed March 7, 1951     7 Sheets-Sheet 4

INVENTOR
A. M. CLOGSTON
BY
Hugh S. Wentz
ATTORNEY

Oct. 30, 1956  A. M. CLOGSTON  2,769,148
ELECTRICAL CONDUCTORS

Filed March 7, 1951  7 Sheets-Sheet 5

INVENTOR
A. M. CLOGSTON
BY
Hugh S. Wertz
ATTORNEY

Oct. 30, 1956   A. M. CLOGSTON   2,769,148
ELECTRICAL CONDUCTORS

Filed March 7, 1951   7 Sheets-Sheet 6

INVENTOR
A. M. CLOGSTON
BY Hugh S. Wentz
ATTORNEY

Oct. 30, 1956  A. M. CLOGSTON  2,769,148
ELECTRICAL CONDUCTORS
Filed March 7, 1951  7 Sheets-Sheet 7

INVENTOR
A. M. CLOGSTON
BY
Hugh S. Wertz
ATTORNEY

United States Patent Office 2,769,148
Patented Oct. 30, 1956

2,769,148
ELECTRICAL CONDUCTORS

Albert M. Clogston, Morris Plains, N. J., assignor to Bell Telephone Laboratories, Incorporated, New York, N. Y., a corporation of New York Application March 7, 1951, Serial No. 214,393

45 Claims. (Cl. 333—84)

This invention relates to electrical conductors and has as one of its principal objectives the improvement of electrical conductors with respect to "skin effect."

Due to the phenomenon known as "skin effect," at high frequencies the current distribution through a conductor is not uniform. Consider, for example, the case of a two-conductor coaxial line to which are applied waves of increasing frequency. At zero and sufficiently low frequencies the currents in the conductors are substantially uniformly distributed throughout and the resistance of the conductors and hence the conductor loss in the line is at a minimum. With increasing frequency the current distribution changes so that the current density is a maximum at the inner surface of the outer conductor and at the outer surface of the inner conductor and decreases into the material at a rate depending on the frequency and the material. In the example given the current density may be negligible at the other surface of each conductor. From another point of view, the electromagnetic field between the two conductors (where the useful power is transmitted) penetrates into the conductors with a field intensity decreasing with distance. Thus the current density (or field) in each conductor is associated with a power loss that is a function of the distribution of current density (or field) across the thickness of the conductor.

It is thus a more particular object of this invention to reduce the power loss associated with skin effect in electrical conductors.

Further objects of the invention are to reduce the extent to which the power loss in such a conductor varies with frequency, and to make such power loss and consequently its contribution to the attenuation of a transmission line or other wave-guiding structure made up of such conductors substantially independent of frequency over a broad band of frequencies from the lowest frequency of interest to the highest. For example, in practice such a band might be comparatively narrow or alternatively might be sufficiently wide as to accommodate a plurality of wide-band television channels.

This invention, in one of its more important aspects, resides in a composite electrical conductor that is separated, transverse to the direction of desired wave energy propagation, into a multiplicity of insulated conducting elements of such number, dimensions and disposition relative to each other and the orientation of the electromagnetic wave as to achieve a more favorable distribution of current and field within the conducting material.

In the case of the two-conductor coaxial line, one or both of the conductors is formed, in accordance with the invention, of a multiplicity of thin metal laminations insulated from one another by layers of insulating material, the smallest dimension of the laminations being in the direction perpendicular to both the direction of wave propagation and the magnetic vector. A convenient yardstick in referring to the thickness of the metal laminations and of the insulating layers is the distance $\delta$ given by $$\delta = \sqrt{\frac{1}{\pi f \mu \sigma}} \tag{1}$$

where $\delta$ is expressed in meters, $f$ is the frequency in cycles per second, $\mu$ is the permeability of the metal in henries per meter, and $\sigma$ is the conductivity of the metal in mhos per meter. The factor $\delta$ measures the distance in which the current or field penetrating into a slab of the metal many times $\delta$ in thickness will decrease by one neper; i. e., their amplitude will become equal to $1/\epsilon = 0.3679$ . . . times their amplitude at the surface of the slab.

This factor $\delta$ will be called one skin thickness or one skin depth. In the case being considered, it is contemplated that the thickness of each lamination is many times (for example, 10, 100 or even 1000 times) smaller than $\delta$ (in general, the thinner the better) and that there will be many laminations (for example, 10, 50, 100 or more). It has been found that when the conductor has such a laminated structure, a wave propagating along the conductor at a velocity in the neighborhood of a certain critical value will penetrate further into the conductor (or completely through it) than it would penetrate into a solid conductor of the same material. This results in a more uniform current distribution in the laminated conductor and consequently lower losses. Another way of looking at this result is to say that the "effective skin depth" is much larger in the laminated conductor than the skin depth $\delta$ for a solid conductor of the same material as the laminations.

The critical velocity mentioned above is determined by the thickness of the metal and insulating laminae, and the dielectric constant of the insulating material. The electromagnetic wave can be caused to propagate in the neighborhood of this critical velocity by a variety of means including (for example) the proper disposition of dielectric material in the vicinity of the conductor. By way of example, in one form of coaxial cable constructed in accordance with the invention, that is, in the case of two laminated concentric conductors (each comprising a multiplicity of metal laminae thin compared to $\delta$ separated by thin insulating layers) which are separated from each other by a main dielectric, the wave propagates at the critical velocity if the dielectric constant of the main dielectric is given by $$\epsilon_1 = \epsilon_2 \left(1 + \frac{W}{t}\right) \tag{2}$$

where $\epsilon_1$ is the dielectric constant of the main dielectric element between the two conductors in farads per meter, $\epsilon_2$ is the dielectric constant of the insulating material between the laminae of the conductors in farads per meter, $W$ is the thickness of one of the metal laminae in meters, and $t$ is the thickness of an insulating layer in meters. The insulating layers are also made very thin and an optimum thickness for certain types of structures in accordance with the invention (as will be described more fully below) is that in which each insulating layer is one-half of the thickness of a metal lamina.

The principles of the invention are not limited to laminations but are applicable also to filaments. Moreover, in certain circumstances, the laminations or filaments need not be continuous, as breaks therein will not cause the conductor to be inoperative at high frequencies. The invention is applicable to coaxial cables, wave guides, antennae, resonators, cable pairs, and single composite conductors of any cross section and for any of a great variety of uses—to mention just a few types of conductors wherein the present invention can be applied.

The invention will be more readily understood by referring to the following description taken in connection with the accompanying drawings forming a part thereof, in which:

Fig. 1A is a schematic representation of an electromagnetic wave propagating through space in the neighborhood of an electrical conductor;

Fig. 1B is a graph of current density vs. depth (distance away from the surface) in the conductor of Fig. 1A;

Fig. 2A is a schematic diagram showing respectively the directions of electric and magnetic field vectors and the direction of propagation of an electromagnetic wave near the surface of a composite conductor in accordance with the invention;

Fig. 2B is a graph having the same coordinates as in Fig. 1B, and showing the increased skin depth produced by the conductor of Fig. 2 as compared with that of Fig. 1A;

Fig. 3A is an end view of a coaxial transmission line in accordance with the invention, the inner conductor of the line comprising a multiplicity of metal laminations insulated from one another and the inner and outer conductors being separated by dielectric material;

Fig. 3B is a diagrammatic representation showing the distribution of current in the inner and outer conductors of the embodiment shown in Fig. 3A;

Fig. 3C is a longitudinal view, with portions thereof in section, of the embodiment shown in Fig. 3A, a continuous dielectric being used between the inner and outer conductors;

Figure 3D:
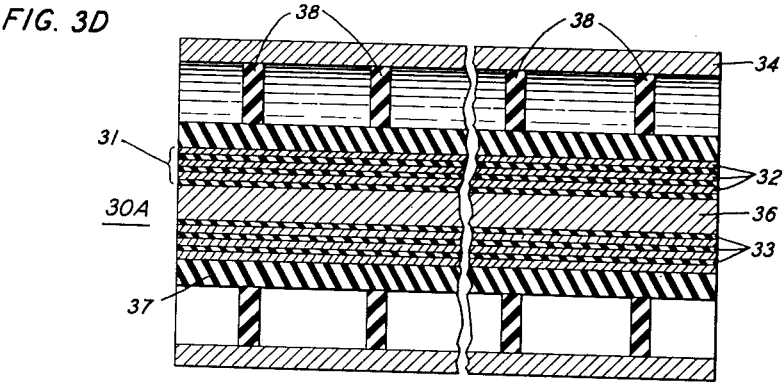
Fig. 3D is a longitudinal cross-sectional view of a section of a cable of the type shown in Fig. 3A, except that the dielectric material between the inner and outer conductors only partially fills the space therebetween.

Referring more particularly to the drawings, consider an electromagnetic wave propagating through space in the neighborhood of, and parallel to the surface of an electrical conductor such as copper, silver or aluminum, for example. This situation is shown diagrammatically in connection with the conductor 10 in Fig. 1A which can be representative of many phenomena. It can illustrate, for instance, the transmission of an electromagnetic wave through a coaxial line, or along an open or shielded two-wire system, or a wave propagating through a metal waveguide. It can also represent the situation in the vicinity of a transmitting or receiving antenna. Clearly a very broad class of electrical phenomena involving the transfer or periodic oscillation of electromagnetic energy in the vicinity of electrical conductors is represented in Fig. 1A.

The wave propagating in Fig. 1A is necessarily accompanied by electric currents flowing in the metal. Because of these currents, power is removed from the electromagnetic field and dissipated in the metal. This effect is nearly always undesirable. The distribution of this current in a direction away from the surface is shown in Fig. 1B where it has been assumed that the conductor is thick compared to $\delta$ if the frequency is sufficiently high. Because of the well-known "skin effect," most of the current flows in a thin layer near the surface. The distance from the surface at which the current density has fallen to $1/\epsilon = 0.3679$ . . . times its value at the surface is known (as mentioned above) as the "skin depth" and is denoted by $\delta$. The distance is expressed in terms of the frequency ($f$) under consideration and the permeability ($\mu$) and conductivity ($\sigma$) of the metal in Equation 1 above. With a given amplitude of the electromagnetic wave, the amount of power lost to the metal will be proportional to $1/\delta\sigma$. Referring to Equation 1, it can be seen that the power loss is proportional to $1/\sqrt{\sigma}$ so that normally the power loss is minimized by choosing a metal of high conductivity, such as copper or silver.

Suppose that it were possible to arbitrarily increase $\delta$ without greatly changing $\sigma$. It is clear that in such a situation the power loss from the electromagnetic wave would be greatly decreased. It has been discovered that it is possible to do just this thing, and the present invention is based on this discovery. A simple embodiment of the invention will be considered first and then more general cases will be discussed. Referring to Fig. 2A, there is again shown an electromagnetic wave propagating near the surface of an electrical conductor 20. The relationship of the electric and magnetic vectors and of the direction of propagation of the electromagnetic wave are shown. The conductor in Fig. 2A is no longer a solid piece of metal but is composed of many spaced laminae 21 of metal of thickness W arranged parallel to the direction of propagation and parallel to the magnetic vector as shown. These laminae are very thin compared to $\delta$ and are separated by empty space or any appropriate dielectric 22 such as air, polyethylene, polystyrene, quartz, or polyfoam, for example, the thickness thereof being represented by $t$. Whatever the dielectric is, suppose that its dielectric constant is $\epsilon_2$, and suppose that the conductivity of the metal is $\sigma$, as before. Fig. 2A is representative of many situations of which a few will be indicated later. The particular cases being considered in which the magnetic vector is parallel to the surface of the composite conductor are not representative of all cases, as will be indicated below.

Since the stack of metal laminae in Fig. 2A will not conduct direct current in a direction perpendicular to the plane of the laminae, it is possible by conventional means to measure an average dielectric constant associated with this direction. This average dielectric constant will be denoted by $\bar{\epsilon}$ and is given by the expression $$\bar{\epsilon} = \epsilon_2 (1 + W/t) \text{ farads per meter} \qquad (3)$$

An electromagnetic wave propagates in a material of dielectric constant $\epsilon$ and permeability $\mu_0$ with a velocity $1/\sqrt{\epsilon\mu_0}$: Let it now be assumed that it has been arranged that the electromagnetic wave in Fig. 2A is traveling with the velocity an electromagnetic wave will have in a medium of dielectric constant $\bar{\epsilon}$ and permeability $\mu_0$. This condition can be arranged by properly disposing suitable dielectric material in all or part of the region traversed by the wave outside the stack. The condition can also be fulfilled by properly shaping adjacent electrical conductors, and a particularly advantageous way of bringing about this condition will be described later in connection with Fig. 5.

Under the conditions mentioned, if W is small compared to $\delta$, we can define an effective skin depth $\delta_e$ by $$\delta_e = (W+t)\sqrt{3}\left(\frac{\delta}{W}\right)^2 \text{ meters} \qquad (4)$$

If the stack of laminations is several times $\delta_e$ in thickness, the current density will decrease exponentially into the stack and be reduced by one neper at a distance below the surface equal to $\delta_e$. This "increased" or "effective" skin depth is shown in Fig. 2B. Furthermore, the effective conductivity $\sigma_e$ of the stack of laminations in the direction of propagation of the wave is given by $$\sigma_e = \sigma \frac{1}{1 + t/W} \qquad (5)$$

We can now form the term $$\frac{1}{\delta_e \sigma_e}$$

and find that it is given by $$\frac{1}{\delta_e \sigma_e} = \frac{1}{\sigma\delta} \frac{1}{\sqrt{3}}\left(\frac{W}{\delta}\right) \qquad (6)$$

It is immediately observed that the power lost from the electromagnetic wave has been reduced by a factor $$\frac{1}{\sqrt{3}}\left(\frac{W}{\delta}\right)$$

For instance, if the laminae in a typical case are $\frac{1}{10}$ skin depth thick, the power taken from the wave will be only $\frac{1}{17}$ of the power that would be lost to a solid conductor.

The increased skin depth described above not only is effective in greatly reducing conductor losses, but has a further major concomitant advantage. Referring to Equation 1 it can be seen that conductor losses generally increase as the square root of the frequency. This variation with frequency very often is equally as troublesome as the losses themselves. A simple but extremely wasteful way to reduce this effect is to make the metal conductor very thin. Suppose for instance that the skin depth is $\delta$ at the highest frequency under consideration. If the conductor is no thicker than $\delta$ the losses will clearly remain uniform, but high, from very low frequencies up to this maximum. Similarly, with the arrangement of Fig. 2A the size of the stack can be limited to the thickness $\delta_e$ determined by Equation 4 at the highest frequency, and thereby obtain uniform loss. But since $\delta_e$ may be made as large as desired by making W small enough, this uniform loss can be achieved without accepting greatly increased losses at the lower frequencies.

The general situation indicated in Fig. 2A can have many specific embodiments and variations of which a few will now be described.

In Figs. 3A and 3C there is shown, in end view and longitudinal view, respectively, with portions in cross section, a coaxial transmission line 30 constructed in a conventional way except that the inner conductor 31 is formed of many thin coaxial laminations of metal 32 and of some suitable dielectric 33. The region between the inner and outer conductors 31 and 34 is filled with insulating material 35 of dielectric constant equal to the average dielectric constant of the stack as described above and in Equation 3. Fig. 3B shows the approximate distribution of current in the inner and outer conductors 31 and 34. The current is observed to decrease rapidly with distance into the solid outer conductor 34 and much more slowly into the laminated inner conductor 31. Because the current falls off more slowly with distance into the inner conductor than it would if the inner conductor were solid, the attenuation of the transmission line is much less than it would be with the conventional solid inner conductor which usually has a larger resistance than the outer conductor. The line in Fig. 3A is shown with an inner core 36. This core in specific instances can be metal or dielectric or even be omitted altogether. The dielectric material 35 shown might equally well fill only part of the region between inner and outer conductors (as shown in Fig. 3D wherein the dielectric 37 takes up only a portion of the space between the inner and outer conductors) and would have in that case a large value of dielectric constant than that described in Equation 3. The dielectric 37 may be held in place by spacers 38, if desired, and may be in the form of one or more dielectric cylinders surrounding the inner conductor.

Figure 4:
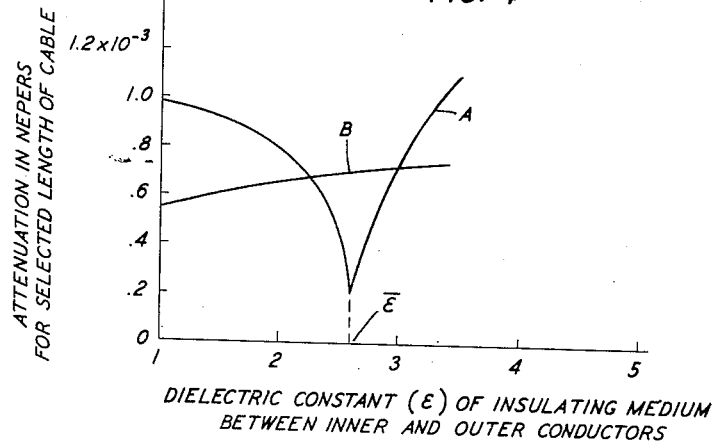
Fig. 4 is a graph of attenuation vs. dielectric constant of the insulating medium between the inner and outer conductors of (A) a coaxial cable of the type shown in Fig. 3A and (B) a coaxial cable of a conventional type.

By way of example, the behavior of a specific line of the type described above is shown in Fig. 4. The line has a core of insulating material 0.146 inch in diameter. On this core are laminated 50 layers of insulation each $0.976 \times 10^{-3}$ inch thick and 50 layers of copper each $0.197 \times 10^{-3}$ inch thick. The over-all diameter of the inner conductor is 0.264 inch and the inner and outer diameters of the outer conductor are, respectively, 4.000 and 4.166 inches. Fig. 4 compares the attenuation of a selected length (94⅛ inches) of this line (curve A) with that of a conventional line (curve B) having a solid inner conductor of the same diameter, as the dielectric constant of the insulating material between the inner and outer conductors is varied. The attenuation of the new line is seen to reach a minimum for $\epsilon = \bar{\epsilon}$, where $\bar{\epsilon}$ has the value given in Equation 3, and this minimum value is much less than that of the conventional line. Even for values of $\epsilon$ appreciably different than $\bar{\epsilon}$ (as shown in Fig. 4), the new line has advantages over the conventional one.

Figure 5:
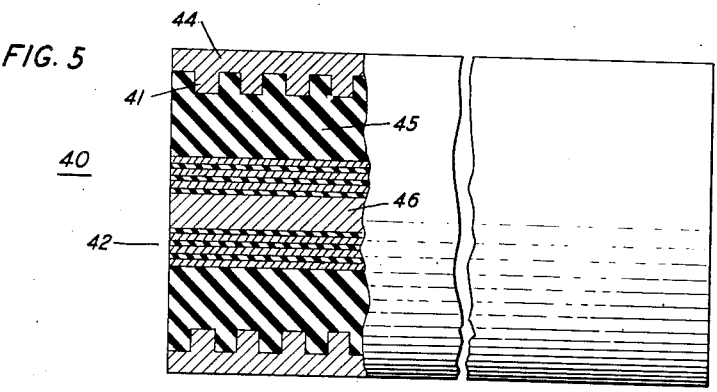
Fig. 5 is a longitudinal view, portions in cross section, of a modification of the embodiment shown in Fig. 3C in which the outer conductor is shaped to reduce the velocity of propagation.

Fig. 5 is a longitudinal view of a transmission line 40 somewhat similar to that shown in Fig. 3A. This example indicates how the velocity of the wave in the line can be adjusted to the proper value by appropriately shaping the outer conductor 41 (in a manner well known) to reduce the velocity of propagation. This arrangement is equally as effective as that shown in Fig. 3A in achieving reduced transmission losses. The inner conductor 42 is similar to the inner conductor 31 of the arrangement of Fig. 3A. The core 46 is similar to the core 36.

Figure 6:
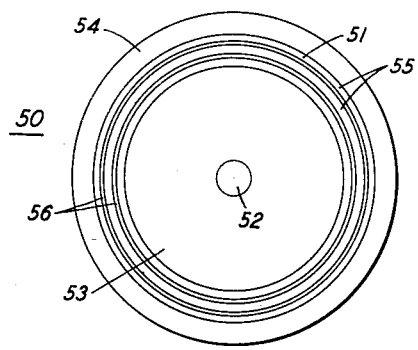
Fig. 6 is an end view of another form of coaxial cable in accordance with the invention, the outer conductor comprising a multiplicity of metal laminations separated by insulating material and the inner conductor being of a conventional form, the outer and inner conductors being separated by dielectric material.

In Fig. 6 is shown another possible embodiment 50 of the invention in which a stack of insulated metal laminations makes up the outer conductor 51. The inner conductor 52 can be a solid or tubular conductor and it is separated by a dielectric 53 from the laminated outer conductor 51 comprising alternately disposed metal and insulating layers 55 and 56, respectively. A sheath 54 of metal or other appropriate material or combination of materials, surrounds the outer conductor 51 for shielding purposes.

Figure 7A:
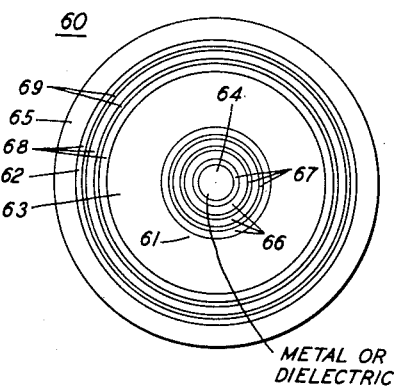
Fig. 7A is an end view of still another form of coaxial cable in accordance with the invention, in which both inner and outer conductors are laminated and are separated by dielectric material.
Figure 7B:
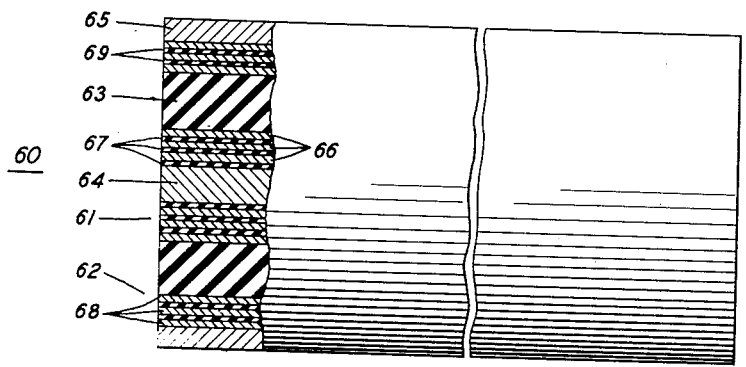
Fig. 7B is a longitudinal view, with portions in cross section, of a section of cable of the type shown in Fig. 7A.

In Figs. 7A and 7B still another arrangement is illustrated, comprising a laminated inner conductor 61 of alternately disposed laminations of metal and insulating material 66 and 67, respectively, separated by a main dielectric 63 from an outer conductor 62 which is formed of similar laminations 68 and 69, respectively. A sheath 65 surrounds the outer conductor. The dielectric constant of the main dielectric 63 is made equal to $\epsilon_2(1 + W/t)$ where $\epsilon_2$ is the dielectric constant of the laminations 67 and 69, W is the average thickness of a metal lamination 66 or 68, and $t$ is the thickness of an average lamination 67 or 69 of insulation. By choosing proper values of $\epsilon_2$, W and $t$ the average dielectric constant $\bar{\epsilon}$ of each stack (61 and 62) can be made equal to one another although the $\epsilon_2$, W and $t$ of one stack may be different from that of the other.

Figure 8:
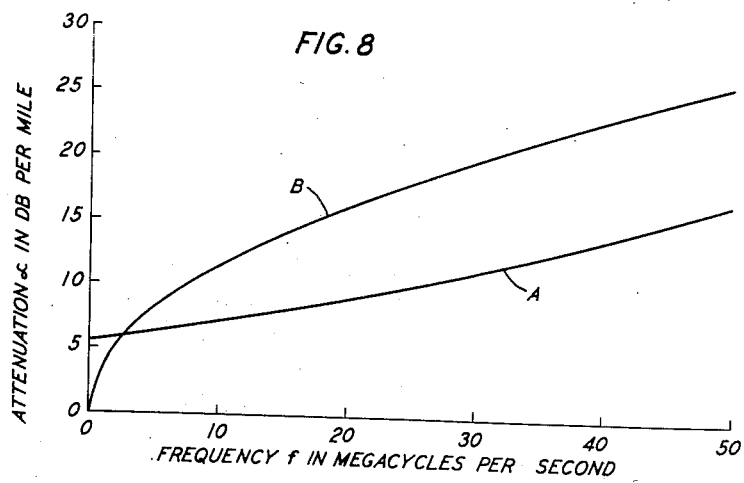
Fig. 8 is a graphical representation showing the attenuation as a function of frequency (A) of a cable of the type shown in Fig. 7A and (B) of a standard coaxial cable of the same outer dimensions.

Again by way of example, the behavior of a specific line of the type shown in Fig. 7A is shown in Fig. 8. This line has a dielectric core 64 of diameter .066 inch and carries a stack 61 of 50 layers of copper 66 and 50 layers of insulation 67 each .0001 inch thick. The outer conductor 62 has an inner diameter of 0.330 inch and also carries a stack of 50 laminations each of metal and insulation similar to that of the inner conductor. The dielectric constant of the material 63 between inner and outer conductors is adjusted to the optimum value given in Equation 4. Fig. 8 shows the attenuation (curve A) of this cable 60 as a function of frequency from 0 to 50 megacycles per second. Also shown is the attenuation curve (curve B) for a conventional, air-filled coaxial line of nearly the same dimensions (diameter of inner conductor 0.1000 inch and inside diameter of outer conductor 0.375 inch). The decreased attenuation and less rapid variation with frequency are clearly demonstrated.

With the cables shown in Figs. 3A, 6 and 7A there exists an optimum proportioning of the thickness of the metal and dielectric lamina. For best results, each dielectric lamina is made one-half the thickness of a metal lamina, or, in some specific instances, greater than half this thickness.

Figure 9:
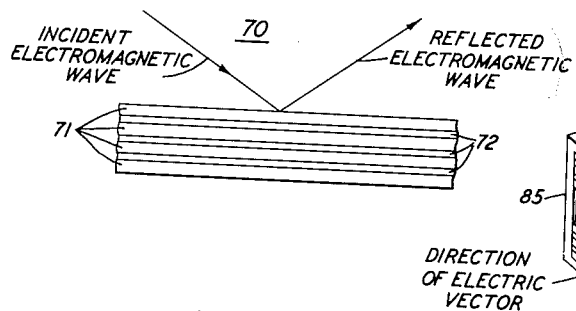
Fig. 9 is a graphical representation showing an electromagnetic wave being reflected from an extended metal surface laminated in accordance with the invention.

Fig. 9 illustrates an electromagnetic wave being reflected from an extended metal surface 70 laminated as above to have a multiplicity of alternately positioned metal layers 71 and insulating layers 72 to reduce losses incident upon reflection. One component of this wave may be considered as traveling parallel to the surface and the other component perpendicular to the surface. Clearly, the conductor losses associated with the component of the wave traveling parallel to the surface can be reduced below those encountered with a solid sheet of metal by use of laminations.

Figure 10:
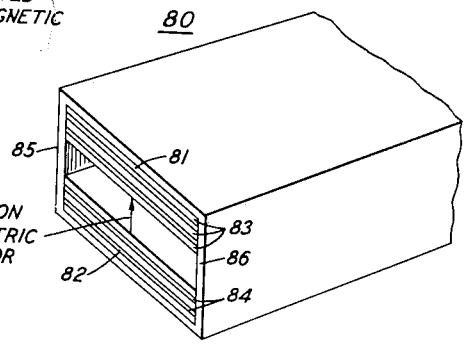
Fig. 10 is a perspective view of a wave-guide structure in accordance with the invention.

In Fig. 10, there is shown a section of a wave guide 80, a pair of whose walls 81 and 82 have been covered with thin metal laminations 83 separated by insulation 84 as before. The two walls 81 and 82 are connected by walls 85 and 86 of solid metal. Here also, decreased attenuation can be realized if the electromagnetic wave propagates down the guide with a velocity in the neighborhood of that appropriate to the average dielectric constant of the stack. Obviously, other wave-guide arrangements utilizing this principle are possible.

Figure 11A:
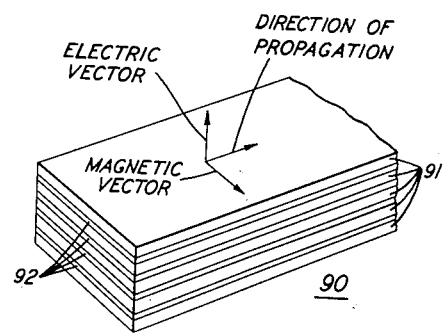
Fig. 11A is a perspective view of a "stack" in accordance with the invention showing the direction of the electric vector, the direction of the magnetic vector and the direction of propagation of the electromagnetic wave in the stack.
Figure 11B:
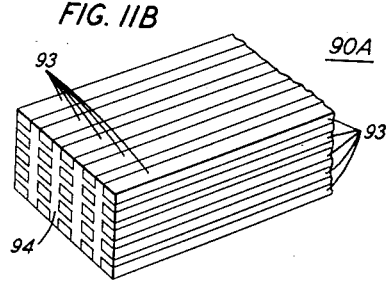
Fig. 11B is a perspective view of a modification of the stack shown in Fig. 11A, the sheets being replaced by rows of rectangular rods, all the rods being separated from adjacent ones by insulating material.
Figure 11C:
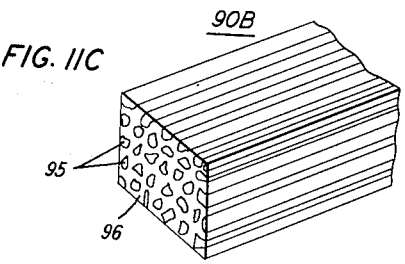
Fig. 11C is a perspective view of a modification of the arrangement shown in Fig. 11B, the rods being of irregular size, shape and disposition.

In Fig. 11A there is shown drawn in perspective a laminated conductor 90 similar to that in Fig. 2A and made up of alternately disposed metal layers 91 and insulating layers 92. It is clear that a similarly effective arrangement 90A of conductors would be that shown in Fig. 11B where each metal lamination is divided into a series of rectangular rods 93 spaced by insulation 94. It is now also clear that the rods 93 of Fig. 11B need not be regularly arranged and indeed need not be even rectangular in section. The conductor could in fact be composed as shown in Fig. 11C of an irregularly arranged group 90B of conductors 95 of irregular cross section spaced from one another by some suitable solid dielectric 96 or air or vacuum. In fact, all that is required in order that the conductor 90B in Fig. 11C be as effective as the laminations 91 in Fig. 11A for reducing conductor losses is that each of the individual conductors in Fig. 11C have a maximum dimension in the direction of the electric vector small compared to $\delta$. Under those circumstances a bundle of conductors as in Fig. 11C may replace the laminations in the examples given in Figs. 3A, 5, 6, 7A, 9 and 10.

Suppose now the further step is taken of requiring the conductors 95 in Fig. 11C to have the largest dimension in any direction perpendicular to their length small compared to $\delta$. It is now no longer required that the magnetic vector be parallel to the surface of the composite conductor. Under these circumstances several more specific embodiments of the invention can be considered.

Figure 12:
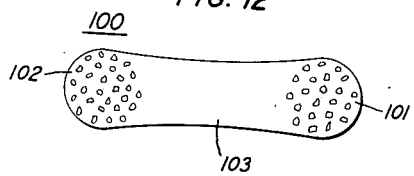
Fig. 12 is an end view of a two-conductor line in accordance with the invention, each of the conductors comprising a multiplicity of tiny filaments separated by insulating material and the two conductors being separated by a dielectric.

For example, in Fig. 12 there is shown a two-conductor transmission line 100 of a type in common use with each of the conductors 101 and 102 constructed as shown in Fig. 11C. Substantial improvement in performance over the conventional two-wire system can be expected. Suitable dielectric 103 is shown joining the two composite conductors 101 and 102 so that the electromagnetic wave will propagate along the system with a velocity appropriate to the average transverse dielectric constant of the bundles.

one of the metal laminations 32, in which case a flared end is not necessary.

Figure 22:
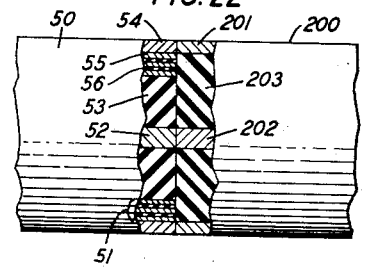
Fig. 22 represents a way of terminating a coaxial cable of the type shown in Fig. 6.

Fig. 22 shows a terminal connection between a cable 50 such as is shown in Fig. 6 and a coaxial cable of the type 200 described above in connection with Fig. 20. As in Fig. 20, the outer sheath 201 of the cable 200 is connected to the outer sheath 54 of the cable 50 and the inner conductor 202 of the cable 200 is connected to the inner conductor 52 of the cable 50. The dielectric 203 is chosen so that it preferably has the same dielectric constant as the main dielectric 53 of the cable 50.

Figure 20:
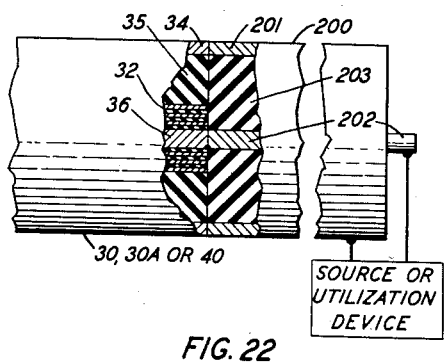
Fig. 20 illustrates a method of terminating coaxial cables of the types shown in Figs. 3A, 3D and 5 where each of these cables has a metallic core.
Figure 23:
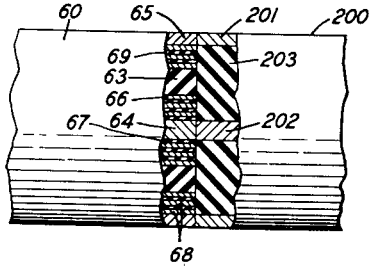
Fig. 23 illustrates a method of terminating the cable shown in Fig. 7A in the case where the central core is of metallic material.

In the termination shown in Fig. 23, the cable 60 of Fig. 7A is butted against and is connected to a cable 200 of the type shown in Fig. 20. The dielectric constant 203 is made equal to the dielectric constant of the member 63.

Figure 24:
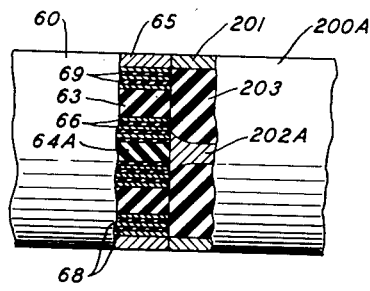
Fig. 24 illustrates a method of terminating the cable shown in Fig. 7A in the case where the central core is of dielectric material.

Fig. 24 shows a method of terminating a cable 60 when the inner conductor 64A thereof is of dielectric material rather than of metal as in the arrangement of Fig. 23. The connecting cable is of the type 200A as in Fig. 21, the central core 202A thereof being large enough in diameter or the end thereof flared so that it contacts at least the inner one of the metal layers 66 around the central core. The dielectric constant of the substance 203 is made equal to that of the member 63.

Figure 17A:
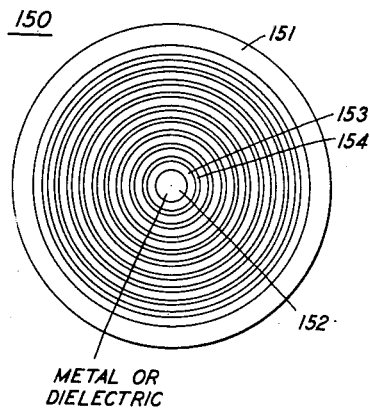
Fig. 17A is an end view of another form of coaxial cable in accordance with the invention, in which all of the space between an outer sheath and an inner core is filled with metal laminations insulated from one another.
Figure 25:
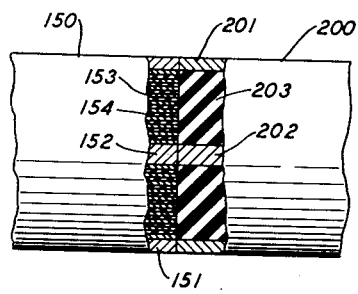
Fig. 25 shows a method of terminating the coaxial cable shown in Fig. 17A in an arrangement thereof wherein the central core is of metal.
Figure 26:
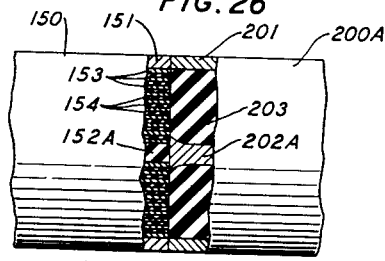
Fig. 26 represents a way of terminating the cable of Fig. 17A in the case where a dielectric central core is employed.

Fig. 25 shows a way of terminating the cable of the type of that shown in Fig. 17A where the central conductor 152 is of metallic material, while Fig. 26 shows a corresponding arrangement where the central conductor 152A is of dielectric material. In Fig. 25 the connector cable 200 is similar to that used in Fig. 20 while the connector cable 200A of Fig. 26 is similar to that shown in Fig. 21. In each of the arrangements of Figs. 25 and 26, the dielectric constant of the material 203 is made equal to that of the average dielectric constant of the stack of metal and insulating material laminations 153 and 154, respectively. In Fig. 26, the inner conductor 202A is made large enough or the end thereof is flared (as in Fig. 21) so that the end contacts at least the inner one of the metallic laminations 153.

Figure 18A:
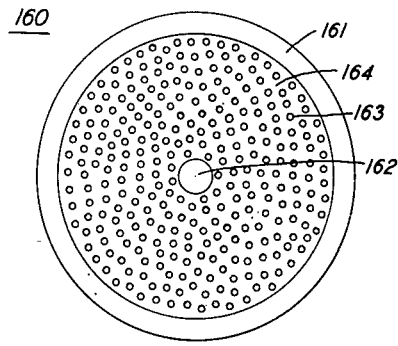
Fig. 18A is an end view of another transmission line in accordance with the invention, in which the space between a central core and an outer sheath is filled with a multiplicity of filaments insulated from one another.
Figure 27:
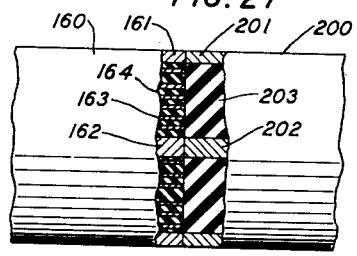
Fig. 27 illustrates a way of terminating the cable shown in Fig. 18A.

Fig. 27 illustrates how a conductor of the type of that shown in Fig. 18A can be terminated. As in many of the previous figures, a connector cable 200 is used and the inner core 202 is connected to the inner core 162 of the cable 160 and the outer sheath 201 is connected to the sheath 161. The dielectric constant of the member 203 is made equal to the average dielectric constant of the composite conductor formed by the members 163 and the insulation therebetween.

Figure 18B:
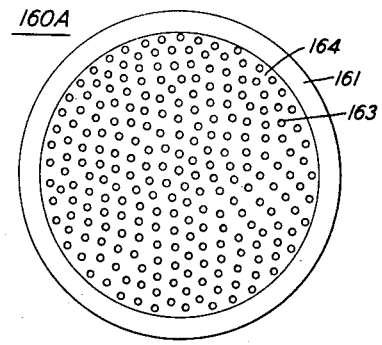
Fig. 18B is an end view of a composite conductor like that shown in Fig. 18A but without the central core.
Figure 21:
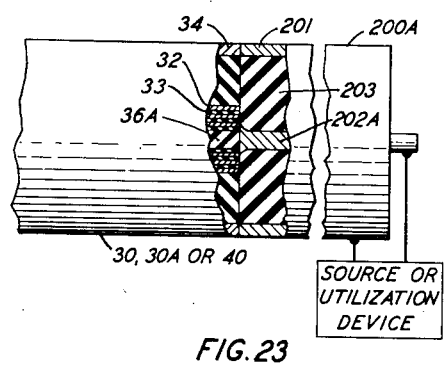
Fig. 21 shows a method of terminating the same three types of coaxial cables in the cases where the inner core is of dielectric material.
Figure 28:
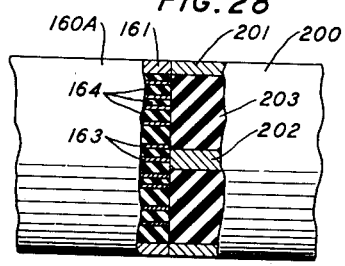
Fig. 28 illustrates a way of terminating the cable shown in Fig. 18B.

Fig. 28 shows how the conductor 160A in Fig. 18B can be terminated, use being made of a connector cable 200A of the same type as that shown in Figs. 21, 24 and 26, the inner core 202 contacting a few of the filaments 163 located in the central portion of the cable 160A. In this arrangement also, the material of the dielectric member 203 is made equal to the average dielectric constant of the composite conductor formed by the members 163 and the insulation therebetween.

Figure 19:
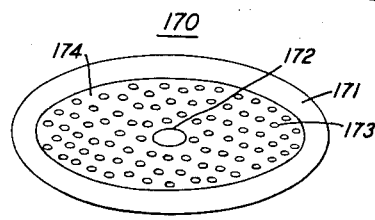
Fig. 19 is an end view of a composite conductor like that of Fig. 18A but in which the cross section is non-circular.
Figure 29:
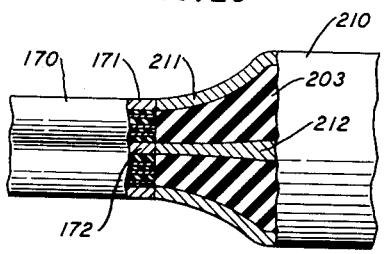
Fig. 29 illustrates a way of terminating the coaxial cable shown in Fig. 19.

Fig. 29 shows a terminating arrangement for the cable 170 which is shown in Fig. 19 with an elliptical cross section. The connector cable 210 has, except for its left-hand portion, a circular cross section but its outer sheath 211 changes gradually from this cross section to an elliptical one at the end surface where it contacts the sheath 171 of the cable 170. The inner core 212 likewise changes from a circular cross section to an elliptical one so that it butts against the entire surface of the inner core 172. If desired, the core 212 can maintain a circular cross section and preferably the diameter thereof is made at least as large as the major axis of the elliptical core 172. The dielectric constant of the material 203 is chosen as in the arrangements of Figs. 18A and 18B.

Figure 13:
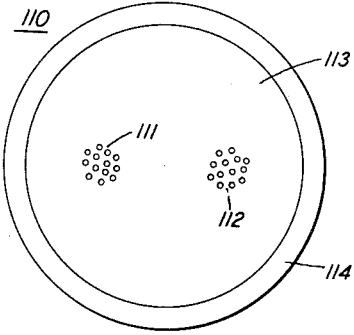
Fig. 13 is an end view of a modification of the arrangement shown in Fig. 12, the two filamented conductors being spaced apart in a dielectric which is inclosed within a metal sheath.
Figure 30:
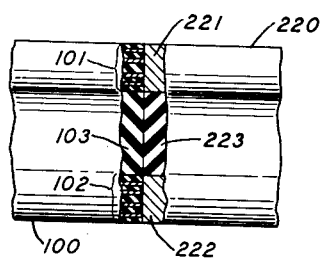
Fig. 30 shows a way of terminating the pair of conductors shown in Fig. 12.

Fig. 30 shows a way of terminating the two-conductor member 100 of Fig. 12. The connector cable 220 in Fig. 30 comprises two solid conductors 221 and 222 (of the same general size as the filamented conductors 101 and 102 of the cable 100) separated by a dielectric 223 of the same general shape as the dielectric strap member 103. The dielectric member 223 is chosen to be equal in dielectric constant to the member 103. It is obvious that the same principle illustrated in Fig. 30 can be applied to terminate a cable arrangement 110 like that shown in Fig. 13. In such an arrangement, the solid conductors 221 and 222 butt against the filamented conductors 111 and 112, no contact being made to the sheath 114 which in the arrangement of Fig. 13 is for shielding purposes only.

Figure 14:
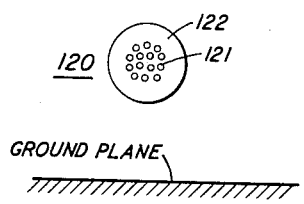
Fig. 14 is an end view of another embodiment of the invention involving a single filamented conductor with a ground return.
Figure 31:
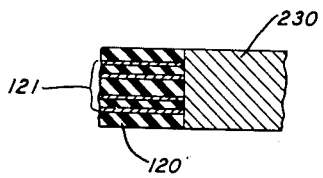
Fig. 31 represents a way of terminating the conductor shown in Fig. 14.

Fig. 31 shows a way of terminating a single filamented conductor of the type 120 shown in Fig. 14. In this situation, a round solid conductor 230 is butted against and connected to the filamented conductor 120 shown in Fig. 14. Obviously this way of terminating the cable 120 can be applied also to a termination for the filamented conductor 131 in Fig. 15.

Various ways of making the cables disclosed herein are available. For example, in connection with the laminated conductors shown in Figs. 3C, 3D, 5, 6, 7A and 17A, a wrapping technique can be employed, the alternate layers being of metal and insulation, respectively. Due to the multiplicity of layers, it makes little difference whether a metallic layer or an insulating layer is applied first to the core (which in the case of some cables may be absent). Any suitable adhesives can be used to make the layers stick properly.

Another way of applying thin coatings on a circular core member is to coat the core member, by a suitable chemical process, with a very thin layer of insulating material and then coat the insulating material with metallic material. These steps are followed by a repetition thereof a multiplicity of times to produce a composite stack having alternate metal and insulating layers.

The structures shown in Figs. 14, 18A, 18B and 19 can be made by coating a multiplicity of very thin filaments with insulating material having low-loss factor and low dielectric constant, grouping a multiplicity of these insulating filaments into an approximately circular (or elliptical as in Fig. 19) bundle (around a circular or elliptical core, if one is used), and then dipping the entire bundle in a coating bath of the same insulating material so as to fill all the space between the metallic filaments with the insulating material. A sheath, if desired, can then be applied to the composite cable in any well-known manner. Similar methods can be used to construct the filamented conductors 101 and 102 in Fig. 12, 111 and 112 in Fig. 13, 90A in Fig. 11B, or 90B in Fig. 11C. In the arrangement of Fig. 13, while there is a sheath, this is applied only after the filamented members 111 and 112 have a relatively large amount of dielectric material 113 applied therearound. The manner in which the other cables or structures not specifically mentioned above are constructed is obvious in view of the descriptions of the manner of making the few chosen by way of example.

It is obvious that many changes can be made in the embodiments described above. The various embodiments and the modifications thereof described herein are meant to be exemplary only and they do not by any means comprise a complete list of conductors to which the present invention is applicable and it is obvious that many more will occur to those skilled in the art. It is intended to cover all such obvious modifications as clearly fall within the scope of the invention, as indicated in the claims.

What is claimed is:

1. In an electromagnetic wave guiding system, a conducting medium comprising a multiplicity of elongated conducting portions spaced by means including insulating material, and means for launching high frequency electromagnetic waves in said system, there being a sufficient number of conducting portions to carry a substan- Figs. 13 and 14 show two more types of transmission line 110 and 120 obviously related to that shown in Fig. 12. In Fig. 13 two bundles 111 and 112 of very fine filaments are buried in a dielectric material 113 which is enclosed by a sheath 114. The dielectric 113 is chosen as in the arrangement of Fig. 12 so that the electromagnetic wave will propagate along the system with the appropriate velocity. Each group of bundles 111 or 112 may have the same dielectric 113 between the elementary filaments or it may utilize a different dielectric.

In Fig. 14 one group of filamentary conductors 121 is enclosed within a dielectric sheath 122 in a manner similar to the cable 110 of Fig. 13. In the arrangement of Fig. 14, unlike that of Fig. 13, the current flows in only one direction through filamented structure, the return in Fig. 14 being through ground or a solid conductor. The dielectric 122 is chosen to provide a proper velocity of propagation appropriate to the average transverse dielectric constant of the bundle of insulated filaments 121.

Figure 15:
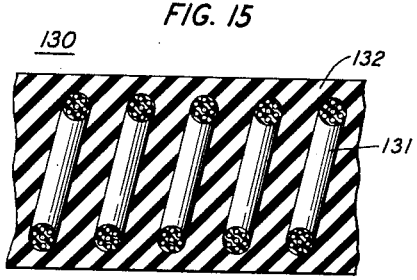
Fig. 15 is a cross-sectional longitudinal view of a coil made with a composite conductor in accordance with the invention embedded in dielectric material.

Fig. 15 illustrates an arrangement 130 in which a section of a coil 131 is embedded in an appropriate dielectric 132. The composite conductor 131 is of the general type shown in Fig. 11C and utilized also in Figs. 12, 13 and 14. Conductor losses are reduced for this type of construction where, as in the other arrangements described above, the dielectric, 132 in this case, is chosen to maintain the proper velocity of the electromagnetic waves around the coil.

Figure 16:
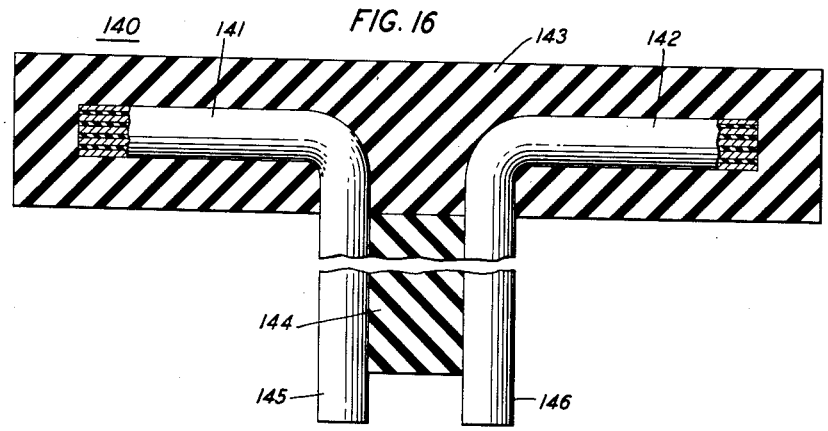
Fig. 16 is a longitudinal view, with portions in cross section, of a dipole antenna in accordance with the invention.

Fig. 16 shows a simple dipole antenna 140 which is illustrative of much more complicated antenna systems. The antenna is provided with composite conductors 141 and 142 of the filamentary type shown in the last few figures and these conductors are encased in appropriate dielectric material 143 chosen to provide the proper velocity of wave propagation. The conductors 141 and 142 are fed to the antenna through a conductor of the type shown in Fig. 12, that is, the two composite conductors 141 and 142 when outside the dielectric 143 are separated by a dielectric member 144 (similar to the central dielectric member 103 in Fig. 12). The ends 145 and 146 of the composite conductors 141 and 142 are then conducted to any desired transmitting apparatus. It is to be understood that the dielectric member 144 between the conductor 141 and 142 may be as long as required (the length being determined by the length of the lead-in for the antenna).

In all the examples of the invention so far considered, special means have been provided to assure that the velocity of propagation of the electromagnetic wave along the system is appropriate to the average transverse dielectric constant of the composite conductors. It has been pointed out that under these conditions the currents penetrate deeply within the composite conductor. It is of course then also true that the electromagnetic wave itself penetrates equally deeply into the conductor. Within the conductor the wave has, as might be expected, an intrinsic velocity of propagation just appropriate to the average transverse dielectric constant. Thus, if the region within which the electromagnetic wave propagates is completely filled with the composite conductor, the condition on the velocities is automatically fulfilled. Fig. 17A illustrates a coaxial transmission line 150 constructed in accordance with this principle. The entire region between the sheath 151 and the core 152 (which may be either of solid tubular metal, either magnetic or non-magnetic, or of dielectric material), is filled with alternate laminae of thin metal and dielectric cylinders 153 and 154, respectively. The metal laminae are, as in the embodiments described above using laminated structures, made as thin as possible compared with the skin depth δ. The dielectric laminations are also made very thin compared to δ and, as pointed out above, in many cases it is preferable to make them smaller than the metal laminations. The material of which the dielectric laminations are made is not critical but is best chosen to have high insulating power and low dielectric constant.

Figure 17B:
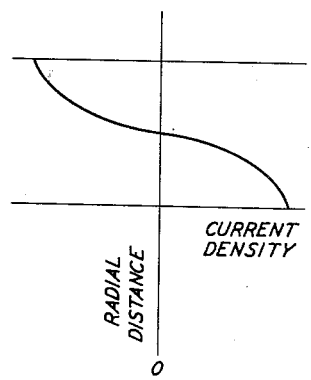
Fig. 17B is a graphical representation showing the approximate variation of current density with radial distance in the structure of Fig. 17A.

In Fig. 17B, an approximate curve of current density within the transmission line 150 vs. radial distance is shown. It will be observed that in the outer layers, current flows in one direction, and that in the inner layers it flows in the opposite direction. The attenuation of such a transmission line 150 is much less than the attenuation of a conventional line of equal outside dimensions.

Fig. 18A shows a cable arrangement 160 comprising an outer metal sheath 161, an inner metal core 162 and a space therebetween filled with a multiplicity of insulated filaments 163 each having a cross section which is small compared with the factor δ (as in the laminated structures described above). The dielectric constant of the insulating material 164 between the filaments is not critical and again is best chosen to have high insulating power and low dielectric constant. The filaments 163 maintain the same relative cross-sectional or radial position along the cable; that is, there is no necessity to transpose them in order to produce the current and field distribution desired.

Fig. 18B shows a modified structure 160A which is similar in all respects to the cable 160 except that the inner core 162 is absent. Another modification of the structure 160 of Fig. 18A is shown in Fig. 19 wherein instead of a circular cross section the cable has an elliptical or other convenient shape, the sheath 171 and the metal inner core 172 (which may be absent) being of elliptical or other convenient configuration. The filaments 173 may be of circular or any other desired configuration, the main requirement being that each of the dimensions in cross section be much smaller than a skin depth δ. The dielectric 174 is chosen with the same care as in the other embodiments heretofore described.

Figs. 20 to 31, inclusive, show various forms of terminations used with the conductor structures shown above. In each case there is the problem of connecting one end of a composite conductor to another conductor in such a way that there is the least possible impedance discontinuity or mismatch at the joint, although generally this condition is not a critical one. In certain situations, however, for example, there may be provided a comparatively larger and very low-loss cable of great length and, with many intervening joints, it obviously would be advantageous to minimize mismatch and accompanying mode conversion at the joints.

In the arrangement of Fig. 20, a cable such as one of the cables 30, 30A and 40 of Figs. 3C, 3D and 5, respectively, has its end position against an end of cable 200 of the coaxial type having an outer conductor 201 and an inner conductor 202, the space between the conductors for a short interval being filled with dielectric material 203 which is preferably the same material as the dielectric 35 of the cable 30. The reference numerals applied to the left-hand cable of Fig. 20 are those of the cable 30 but it will be appreciated that the elements of this cable are also representative of elements serving similar functions in the cables 30A and 40. The outside diameter of the cable 200 is chosen to be the same as the cable 30 so that the sheath 201 butts against and is connected to the sheath 34, and the inner conductor 202 butts against and is connected to inner conductor 36 of the cable 30. By means of this connection a mismatch between the cable 200 and the cable 30 is prevented or kept at a minimum. The cable 200 can be connected at its other end to a source of energy or other utilization device 204.

In the arrangement of Fig. 21, the connection is the same as in Fig. 20 with this difference: the inner core 36A of the cable 30 is of dielectric material rather than of metal and hence the inner conductor 202A of the connecting cable 200A flares out at its end so that it contacts at least the inner one of the metal laminations 32 at the end thereof. Alternatively, the inner conductor 202A can have a diameter large enough to contact at least the inner tial portion of the current induced by said waves and each of said conducting portions having at least one dimension in a direction substantially transverse to the direction of wave propagation down the length thereof which is small compared with its appropriate skin depth at the highest frequency of operation with said high frequency waves whereby the said conducting medium is substantially penetrated by the electric field of said waves.

2. The combination of elements as in claim 1 in which each of said conducting portions is a thin sheet.

3. The combination of elements as in claim 1 in which said conducting portions are arranged in a plurality of groups spaced from one another by a space which is greater than the distance between the conducting portions in the individual groups.

4. The combination of elements as in claim 1 in which each of said conducting portions is a thin sheet and said sheets are arranged in two groups, the two groups being separated from one another by a larger distance than the spacing between any two of the conducting portions within a group.

5. The combination of elements as in claim 1 in which each of said conducting portions is a thin sheet and said sheets are arranged in two groups, the two groups being separated from one another by a larger distance than the spacing between any two of the conducting portions within a group, and means for causing the velocity of electromagnetic wave propagation in and about the conducting medium to have a predetermined substantially uniform value, said causing means including dielectric material in said space between the two groups which is different from the said insulating material.

6. The combination of elements as in claim 1 in which each of said conducting portions is a thin sheet and said sheets are arranged in two groups, the two groups being separated from one another by a larger distance than the spacing between any two of the conducting portions within a group, and there is dielectric material between the two groups.

7. The combination of elements as in claim 1 in which each of said conducting portions is a thin sheet and said sheets are arranged in two groups, the two groups being separated from one another by a larger distance than the spacing between any two of the conducting portions within a group, and dielectric material completely fills the space between the two groups.

8. The combination of elements as in claim 1 in which each of said conducting portions is a thin sheet and said conducting medium is one conductor of a two-conductor coaxial cable.

9. The combination of elements as in claim 1 in which each of said conducting portions is a thin sheet and said conducting medium is the inner conductor of a two-conductor coaxial cable.

10. The combination of elements as in claim 1 in which each of said conducting portions is a thin sheet and said conducting medium is the outer conductor of a two-conductor coaxial cable.

11. The combination of elements as in claim 1 in which each of said conducting portions is a thin sheet and said conducting medium is the inner conductor of a two-conductor coaxial cable, the space between the inner and outer conductors of said cable being filled with dielectric material.

12. The combination of elements as in claim 1 in which each of said conducting portions is a thin sheet and said conducting medium is the inner conductor of a two-conductor coaxial cable, the space between the inner and outer conductors of said cable containing dielectric material.

13. The combination of elements as in claim 1 in which said conducting medium fills the entire space between a coaxially arranged core and sheath.

14. The combination of elements as in claim 1 in which said conducting portions are in the form of thin cylinders surrounding an inner metal core and spaced by means including dielectric material from an outer metal cylinder, in further combination with a coaxial cable to which the conducting medium is joined comprising an outer conductor connected to said outer metal cylinder of the conducting medium, an inner conductor connected to the metal core, and dielectric material between the inner and outer conductors.

15. The combination of elements as in claim 1 in which said conducting portions are in the form of thin cylinders surrounding an inner dielectric core and spaced by means including dielectric material from an outer metal cylinder, in further combination with a coaxial cable to which the conducting medium is joined comprising an outer conductor connected to said outer metal cylinder of the conducting medium, an inner conductor connected to at least the inner one of said thin conducting cylinders surrounding the dielectric core, and dielectric material between the inner and outer conductors.

16. The combination of elements as in claim 1 in which said conducting portions are in the form of thin cylinders positioned between and coaxial with an inner metal core and an outer metal cylinder.

17. The combination of elements as in claim 1 in which said conducting portions are in the form of thin cylinders positioned between and coaxial with an inner dielectric core and an outer metal cylinder.

18. The combination of elements as in claim 1 in which said conducting portions are in the form of thin cylinders positioned between and coaxial with an inner metal core and an outer metal cylinder, in further combination with a coaxial cable to which the conducting medium is joined comprising an outer conductor connected to said outer metal cylinder of the conducting medium, an inner conductor connected to the metal core, and dielectric material between the inner and outer conductors.

19. The combination of elements as in claim 1 in which said conducting portions are in the form of thin cylinders positioned between and coaxial with an inner dielectric core and an outer metal cylinder, in further combination with a coaxial cable to which the conducting medium is joined comprising an outer conductor connected to said outer metal cylinder of the conducting medium, an inner conductor connected to at least the inner one of said thin cylinders, and dielectric material between the inner and outer conductors.

20. The combination of elements as in claim 1 in which said conducting portions are in the form of thin insulated cylinders positioned between and coaxial with an inner metal core and an outer metal cylinder, in further combination with a coaxial cable to which the conducting medium is joined comprising an outer conductor connected to said outer metal cylinder of the conducting medium, an inner conductor connected to the metal core, and dielectric material between the inner and outer conductors which has a dielectric constant substantially equal to the average dielectric constant of the thin insulated cylinders.

21. The combination of elements as in claim 1 in which said conducting portions are in the form of thin insulated cylinders positioned between and coaxial with an inner dielectric core and an outer metal cylinder, in further combination with a coaxial cable to which the conducting medium is joined comprising an outer conductor connected to said outer metal cylinder of the conducting medium, an inner conductor connected to at least the inner one of said thin cylinders, and dielectric material between the inner and outer conductors which has a dielectric constant substantially equal to the average dielectric constant of the thin insulated cylinders.

22. The combination of elements as in claim 1 in which each of said conducting portions is a thin sheet of thickness W separated from an adjacent conducting portion by an insulating layer of thickness $t$ and dielectric constant $\epsilon_2$, and said conducting sheets and their corresponding insulating layers are arranged in two stacks separated by a main dielectric element of dielectric constant $\epsilon_1$ and having a much greater thickness than W, said dielectric constants having substantially the relationship $\epsilon_1/\epsilon_2 = W/t + 1$.

23. The combination of elements as in claim 1 in which said conducting medium fills the entire space between a coaxially arranged core and sheath and said conducting medium being characterized in that each conducting portion is a thin cylinder and is separated from an adjacent cylinder by insulation having a thickness of the same general order of magnitude as that of each cylinder.

24. The combination of elements as in claim 1 in which said conducting medium fills the entire space between a coaxially arranged core and sheath and said conducting medium being characterized in that each conducting portion is a thin cylinder and is separated from an adjacent cylinder by insulation having a thickness of the same general order of magnitude as that of each cylinder, all of said cylinders being of substantially the same thickness and all of said spaces between cylinders being substantially equal.

25. The combination of elements as in claim 1 in which each of said conducting portions is a thin sheet and said conducting medium is one conductor of a two conductor coaxial cable the other conductor of which is uniformly of conducting material.

26. The combination of elements as in claim 1 in which each of said conducting portions is a thin sheet and said conducting medium is the inner conductor of a two-conductor coaxial cable the outer conductor of which is uniformly of conducting material.

27. The combination of elements as in claim 1 in which each of said conducting portions is a thin sheet and said conducting medium is one conductor of a two-conductor coaxial cable the other conductor of which has an uneven surface facing the first-mentioned conductor.

28. The combination of elements as in claim 1 in which each of said conducting portions is a thin sheet and said conducting medium is one conductor of a two-conductor coaxial cable the other conductor of which has an uneven surface facing the first-mentioned conductor and the space between the two conductors contains dielectric material.

29. A composite elongated electromagnetic wave conductor adapted for use with high frequency electromagnetic waves comprising a multiplicity of elongated conducting portions spaced by means including insulating material, each of said conducting portions having at least one dimension in a direction substantially transverse to the direction of wave propagation down the length thereof which is small compared with its appropriate skin depth at the highest frequency of operation with said high frequency waves, means including said conducting portions and said insulating material for causing the velocity of electromagnetic wave propagation in and about the composite conductor to have a predetermined value, each of said conducting portions being a thin sheet of thickness W separated from an adjacent conducting portion by an insulating layer of thickness $t$ and dielectric constant $\epsilon_2$, said conducting sheets and their corresponding insulating layers being arranged in two stacks separated by a main dielectric element of dielectric constant $\epsilon_1$ and having a much greater thickness than W, said dielectric constants having substantially the relationship $$\frac{\epsilon_1}{\epsilon_2} = \frac{W}{t} + 1$$

30. In combination, a low loss, broad band transmission line for the transmission of high frequency electromagnetic waves, a source of high frequency waves connected to said line, and a load for said line to utilize the waves transmitted thereby, said line comprising a plurality of conducting elements, there being a sufficient number of conducting elements to carry a substantial portion of the current induced by said waves, insulating members associated with said conducting elements in a manner such that the cross section of said line at any point along its length is the same as the cross section thereof at any other point, the insulating members being so chosen and proportioned relative to each other and the conducting elements to impart to said cable a propagation velocity along its length which is substantially uniform across the cross sectional area of said line, each of said conducting elements having a thickness which is less than its appropriate skin depth at the highest frequency of operation with said high frequency waves, whereby the said conducting elements are substantially penetrated by the electric field of said waves.

31. In combination, a composite elongated electromagnetic wave conductor adapted for use in the transmission of high frequency electromagnetic waves, a source of high frequency electromagnetic waves connected to said conductor, and a load for said conductor to utilize the waves transmitted thereby, said conductor comprising a multiplicity of spaced elongated conducting portions each having at least one dimension in a direction substantially transverse to the direction of wave propagation down the length thereof which is small compared with its appropriate skin depth at the highest frequency of operation at said high frequency waves, whereby said conductor is substantially penetrated by the electric field of said waves, there being a sufficient number of conducting portions to carry a substantial portion of the current in said conductor, and means including insulating portions within the spaces between the conducting portions for maintaining the conducting portions in substantially the same relative positions in the cross-section of the conductor along the length thereof.

32. In combination, a composite high frequency wave conductor, a source of high frequency waves connected to said conductor, and a load for said conductor to utilize the waves transmitted thereby, said composite conductor comprising a stack of alternate independent layers of conducting and insulating material, each of the conducting layers having a thickness less than .0001 of an inch and less than the skin depth at the highest frequency of operation of said conductor, whereby said conductor is substantially penetrated by the electric field of said waves, there being a sufficient number of layers of conducting material to carry a substantial amount of current.

33. In combination, a composite high frequency wave conductor, a source of high frequency waves connected to said conductor, and a load for said conductor to utilize the waves transmitted thereby, said composite conductor comprising a stack of alternate independent layers of more than ten conductors and more than ten insulators, each of the conductors and insulators having a thickness which is less than .0001 of an inch and less than the skin depth at the highest frequency of operation of said conductor, whereby said conductor is substantially penetrated by the electric field of said waves, there being a sufficient number of layers of said conducting material to carry a substantial amount of current.

34. In combination, a composite conductor for a band of frequencies, a source of high frequency waves falling within said band, and a load for said conductor to utilize the waves transmitted thereby, said composite conductor comprising a stack of alternate independent layers of conducting and insulating material, there being a sufficient number of conducting layers to carry a substantial portion of the current in said conductor, each of at least a large number of said conducting layers having a thickness which is small compared to the skin depth of the conducting material at the higest frequency to be propagated, whereby said conductor is substantially penetrated by the electric field of said waves.

35. In combination, a conducting medium for the transmission of high frequency electromagnetic waves, a source of high frequency waves connected to said medium, and a load for said medium to utilize the waves transmitted thereby, said medium comprising a central conductor surrounded by a multiplicity of very thin-shelled coaxial conductors separated from one another by means including very thin insulating cylinders, there being a sufficient number of thin-shelled coaxial conductors to carry a substantial amount of current, the thickness of each coaxial conductor being small compared to the skin depth at the highest frequency to be transmitted, whereby said conducting medium is substantially penetrated by the electric field of said waves.

36. In combination, a conducting medium for the transmission of high frequency electromagnetic waves, a source connected to said medium, and a load for said medium to utilize the waves transmitted thereby, said medium comprising two concentric anisotropic cylinders having conductivity high in the axial direction and low in the radial direction separated by material having a dielectric constant which is substantially equal to the effective radial dielectric constant of each anisotropic cylinder and each of said anisotropic cylinders comprising a plurality of conducting portions separated by insulating material, each of said conducting portions having a transverse dimension which is less than a skin depth at the highest frequency of electromagnetic waves to be transmitted, whereby each of said anisotropic cylinders is substantially penetrated by the field of the waves.

37. In combination, a composite conductor for the longitudinal transmission of waves having a band of frequencies, a source of high frequency waves falling within said band, and a load for said conductor to utilize the waves transmitted thereby, said composite conductor comprising a stack of alternate independent layers of conducting and insulating material, there being a sufficient number of conducting layers to carry a substantial portion of the current in said conductor, each of at least a large number of said conducting layers having a thickness which is small compared to the skin depth of the conducting material at the highest frequency to be propagated, whereby said composite conductor is substantially penetrated by the electric field of said waves, the ratio of thickness of each conducting layer to the insulating layer adjacent thereto being in the order of 2 to 1.

38. In combination, a high frequency transmission line, a source of high frequency electromagnetic waves connected to said line, and a load for said line to utilize the waves transmitted thereby, said line comprising a multiplicity of laminated conductors, the laminae being parallel to the direction of propagation of waves along said line, and means for insulating the laminae from each other, each of the laminae being thin compared to the skin depth at the highest frequency to be transmitted by the line, whereby said laminated conductors are substantially penetrated by the electric field of said waves, there being a sufficient number of laminae to contribute substantially to the current conduction in said cable.

39. A composite high frequency electromagnetic wave conductor comprising conducting and insulating elements positioned in such a way that in any plane parallel to the direction of wave propagation therein and through the center thereof there are parallel-arranged multiple alternations of conducting and insulating portions, the dimension of each conducting portion in said plane in a direction transverse to the wave propagation direction being much smaller than the appropriate skin depth for the material thereof at the highest frequency of electromagnetic wave desired to be propagated in the composite conductor, whereby said composite conductor is adapted to be substantially penetrated by the electric field of the waves being propagated, there being a sufficient number of conducting portions to carry a substantial amount of current, said conducting and insulating elements being so chosen to impart to said conductor a velocity of propagation characteristic which is substantially uniform throughout the cross-sectional area of the conductor transverse to the direction of wave propagation.

40. In combination, a conducting medium for the transmission of high frequency electromagnetic waves, a source of high frequency electromagnetic waves connected to said medium, and a load for said medium to utilize the waves transmitted thereby, said medium comprising two coaxially arranged conductors separated by dielectric material having a dielectric constant greater than 1.5, at least one of said conductors comprising a composite stack of insulated concentric thin-walled conducting cylinders, the wall thickness of each of said thin walled cylinders being less than the appropriate skin depth for the material thereof at the highest frequency of operation of said electromagnetic waves, whereby said conductor is substantially penetrated by the electric field of said waves, there being a sufficient number of conducting cylinders to contribute substantially to the conduction of current in said one conductor.

41. In combination, a conducting medium for the transmission of high frequency electromagnetic waves, a source of high frequency electromagnetic waves connected to said medium, and a load for said medium to utilize the waves transmitted thereby, said medium comprising a multiplicity of coaxially arranged conducting layers and means including dielectric material for substantially equalizing the current density among the concentric conducting layers along the radius of the medium, there being a sufficient number of conducting layers to carry a substantial portion of the current in the medium, each of said conducting layer having a dimension transverse to the direction of wave propagation which is less than the appropriate skin depth at the highest frequency of operation of said waves, whereby said conducting medium is substantially penetrated by the electric field of said waves.

42. A low loss, broad band transmission line comprising first and second conductors separated by dielectric material, at least one of said conductors comprising a plurality of conducting portions separated by insulating material, at least one of said conducting portions having a thickness no greater than a skin depth at the highest frequency of operation of said transmission line and proportioned to carry a substantial amount of current, the dielectric constant of said insulating material differing from the dielectric constant of said dielectric material in a manner such that the velocity of propagation of electrical energy along said line is substantially uniform across the cross-sectional area of said line normal to the direction of propagation.

43. A low loss, broad band transmission line comprising an inner member of conducting material and an outer member of conducting material coaxial therewith, and an intermediate member comprising at least one conducting layer having a thickness no greater than a skin depth at the highest frequency of operation of said line and proportioned to carry a substantial amount of current located between said inner and outer members and coaxial therewith, said intermediate member being separated from said inner member by insulating material and from said outer member by different insulating material, the velocity of propagation characteristic of said line being substantially uniform across the area of said line normal to the propagation direction.

44. A composite elongated electromagnetic wave conductor adapted for use with high frequency electromagnetic waves comprising a multiplicity of elongated conducting portions spaced by means including insulating material, there being a sufficient number of conducting portions to carry a substantial portion of the current in said conductor, each of said conducting portions being a thin sheet having at least one dimension in a direction substantially transverse to the direction of wave propagation down the length thereof which is small compared with its appropriate skin depth at the highest frequency of operation with said high frequency waves, said thin sheets being arranged in two groups, the two groups being separated from one another by a larger distance than the spacing between any two of the conducting portions within a group, said conducting portions, said insulating material and dielectric material in the space between the two groups which is different from the said insulating material being so chosen to cause the velocity of electromagnetic wave propagation throughout the composite conductor to have a predetermined substantially uniform value.

45. A composite elongated electromagnetic wave conductor adapted for use with high frequency electromagnetic waves comprising a multiplicity of elongated conducting portions spaced by means including insulating material, there being a sufficient number of conducting portions to carry a substantial portion of the current in said conductor, each of said conducting portions being a thin sheet of thickness W separated from an adjacent conducting portion by an insulating layer of thickness $t$ and dielectric constant $\epsilon_2$, and said conducting sheets and their corresponding insulating layers being arranged in two stacks separated by a main dielectric member of dielectric constant $\epsilon_1$ and having a much greater thickness than W, said dielectric constants having substantially the relationship $\epsilon_1/\epsilon_2 = W/t+1$, the thickness W of each of said conducting portions being small compared with the appropriate skin depth at the highest frequency of operation with said high frequency waves, said conducting portions and said insulating material being so chosen to cause the velocity of electromagnetic wave propagation throughout the composite conductor to have a predetermined substantially uniform value.

References Cited in the file of this patent

UNITED STATES PATENTS

| | | |
|---|---|---|
| 1,701,278 | Silbermann | Feb. 5, 1929 |
| 2,087,408 | Katzman | July 20, 1937 |
| 2,191,995 | Scott | Feb. 27, 1940 |
| 2,433,181 | White | Dec. 23, 1947 |
| 2,511,610 | Wheeler | June 13, 1950 |
| 2,561,462 | Compton | July 24, 1951 |
| 2,604,594 | White | July 22, 1952 |
| 2,676,309 | Armstrong | Apr. 20, 1954 |

FOREIGN PATENTS

| | | |
|---|---|---|
| 188,764 | Germany | July 15, 1907 |